(12) United States Patent
Ono

(10) Patent No.: US 9,703,409 B2
(45) Date of Patent: Jul. 11, 2017

(54) LIQUID CRYSTAL DISPLAY DEVICE

(71) Applicant: Panasonic Liquid Crystal Display Co., Ltd., Himeji-shi, Hyogo (JP)

(72) Inventor: Kikuo Ono, Ibaraki (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 15/280,499

(22) Filed: Sep. 29, 2016

(65) Prior Publication Data

US 2017/0017329 A1  Jan. 19, 2017

Related U.S. Application Data

(62) Division of application No. 14/199,566, filed on Mar. 6, 2014, now abandoned.

(30) Foreign Application Priority Data

Sep. 3, 2013 (JP) ................................. 2013-182010

(51) Int. Cl.

| | |
|---|---|
| *G02F 1/1343* | (2006.01) |
| *G06F 3/041* | (2006.01) |
| *G02F 1/1362* | (2006.01) |
| *G02F 1/1333* | (2006.01) |
| *G02F 1/1339* | (2006.01) |
| *G02F 1/1368* | (2006.01) |
| *G06F 3/044* | (2006.01) |
| *G02F 1/1335* | (2006.01) |

(52) U.S. Cl.
CPC .......... *G06F 3/0412* (2013.01); *G02F 1/1368* (2013.01); *G02F 1/13338* (2013.01); *G02F 1/13394* (2013.01); *G02F 1/13439* (2013.01); *G02F 1/133345* (2013.01); *G02F 1/134336* (2013.01); *G02F 1/134363* (2013.01); *G02F 1/136227* (2013.01); *G02F 1/136286* (2013.01); *G06F 3/044* (2013.01); *G06F 3/0416* (2013.01); *G02F 1/133512* (2013.01); *G02F 1/133514* (2013.01); *G02F 2001/133302* (2013.01); *G02F 2001/134318* (2013.01); *G02F 2001/136295* (2013.01); *G02F 2201/121* (2013.01); *G02F 2201/123* (2013.01); *G02F 2201/52* (2013.01); *G06F 2203/04103* (2013.01)

(58) Field of Classification Search
None
See application file for complete search history.

(56) References Cited

U.S. PATENT DOCUMENTS

| | | | |
|---|---|---|---|
| 7,990,356 | B2 | 8/2011 | Chung et al. |
| 8,970,532 | B2 | 3/2015 | Kim et al. |
| 2008/0180622 | A1 | 7/2008 | Horiguchi |
| 2013/0075799 | A1 | 3/2013 | Oyamada |
| 2013/0077018 | A1 | 3/2013 | Kuniyoshi et al. |
| 2014/0327840 | A1 | 11/2014 | Kim et al. |

FOREIGN PATENT DOCUMENTS

JP  2008-180928  8/2008

*Primary Examiner* — Richard Kim
(74) *Attorney, Agent, or Firm* — Hamre, Schumann, Mueller & Larson, P.C.

(57) ABSTRACT

A first insulating film is formed between a pixel electrode and a thin film transistor. The pixel electrode is connected to a conductive electrode of the thin film transistor via a contact hole formed in the first insulating film. The common electrode is formed so as to overlap a data signal line in plan view, and a metal wiring, which is electrically connected to the common electrode, is formed so as to overlap at least a part of the contact hole in plan view.

11 Claims, 19 Drawing Sheets

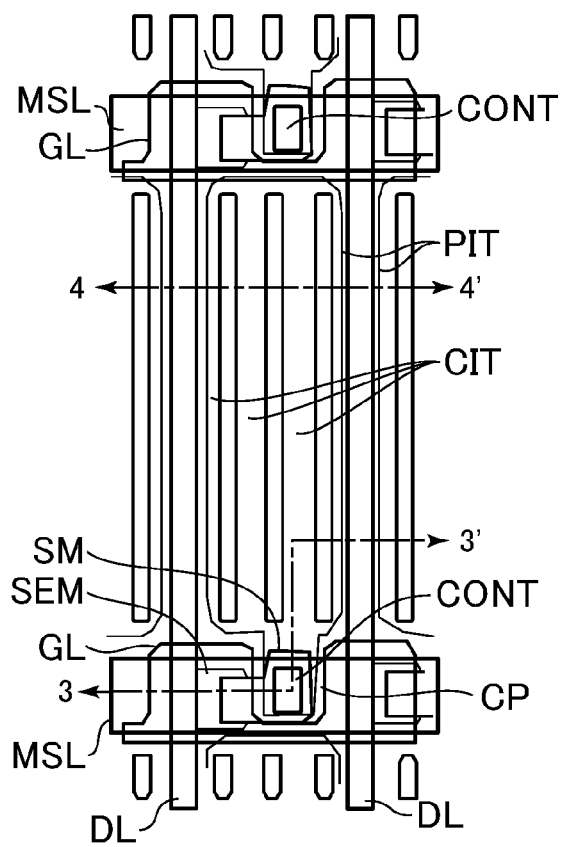
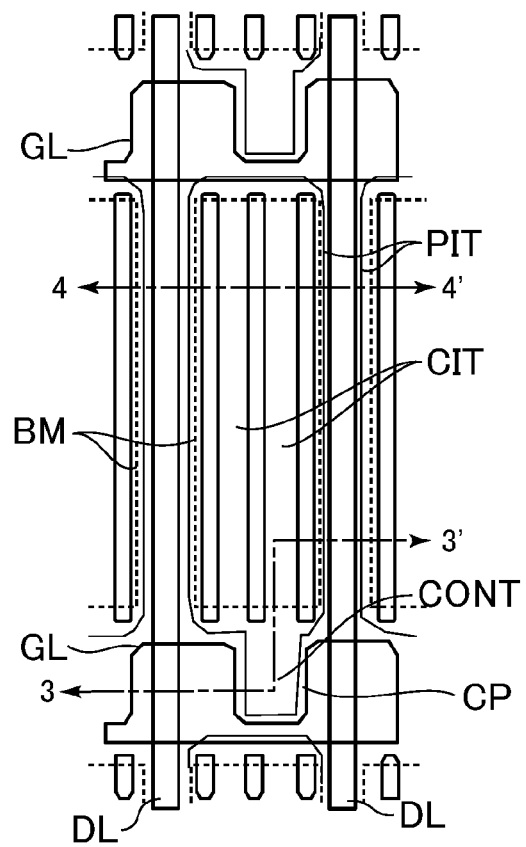
FIG.2A
FIG.2B

LIQUID CRYSTAL DISPLAY DEVICE

CROSS-REFERENCE TO RELATED APPLICATION

The present application claims priority from Japanese application JP 2013-182010 filed on Sep. 3, 2013, the content of which is hereby incorporated by reference into this application.

TECHNICAL FIELD

The present application relates to a liquid crystal display device, and more particularly, to an in-plane switching (IPS) liquid crystal display device.

BACKGROUND

An IPS liquid crystal display device includes, on one of a pair of substrates arranged so as to be opposed to each other via liquid crystal, a pixel electrode and a common electrode in each pixel region on the liquid crystal side. In this configuration, an electric field in a direction parallel to the substrate (lateral electric field) is generated between the pixel electrode and the common electrode so that the lateral electric field is applied to the liquid crystal to drive the liquid crystal. In this manner, the amount of light passing through the region between the pixel electrode and the common electrode is controlled to display an image. The IPS liquid crystal display device has an advantage in that display change is small even when the device is viewed from a direction oblique to a display surface, that is, the device is excellent in so-called wide viewing angle characteristics (See, for example, Japanese Patent Application Laid-open No. 2008-180928).

SUMMARY

However, the liquid crystal display device disclosed in Japanese Patent Application Laid-open No. 2008-180928 has a problem in that the aperture ratio of a pixel is low under the influence of a region in which a contact hole for connecting a pixel electrode and a drain electrode of a thin film transistor TFT and a common wiring formed of a light blocking material are formed.

The present invention has been made in view of the above, and an object of the present invention is to improve the aperture ratio of a pixel in an IPS liquid crystal display device.

In one general aspect, the instant application describes a liquid crystal display device that includes a first substrate on a display surface side and a second substrate on a rear surface side, the first substrate and the second substrate being placed so as to be opposed to each other with liquid crystal interposed therebetween. The second substrate includes a plurality of gate signal lines formed thereon; a plurality of data signal lines formed thereon; a plurality of pixel electrodes and a plurality of thin film transistors formed thereon, which are provided correspondingly to a plurality of pixels formed in a row direction in which the plurality of gate signal lines extend and in a column direction in which the plurality of data signal lines extend; a common electrode formed thereon, which is provided on the display surface side so as to be opposed to the plurality of pixel electrodes; a plurality of metal wirings formed thereon, which are electrically connected to the common electrode; and a first insulating film formed between the plurality of pixel electrodes and the plurality of thin film transistors. Each of the plurality of pixel electrodes is connected to a conductive electrode of each of the plurality of thin film transistors via a contact hole formed in the first insulating film. The common electrode is formed so as to overlap the data signal line in plan view. The metal wiring is formed so as to overlap at least a part of the contact hole in plan view.

The above general aspect may include one or more of the following features. The liquid crystal display device may further include a second insulating film formed on the first insulating film between the plurality of pixel electrodes and the plurality of thin film transistors. The contact hole may be formed in the first insulating film and in the second insulating film. Each of the plurality of metal wirings may be formed so as to overlap, in plan view, the contact hole and a semiconductor layer which forms the thin film transistor.

The second insulating film may include an organic material.

The metal wiring may be formed so as to further overlap the gate signal line in plan view.

The gate signal line may have a notch. The contact hole may be located within the notch in plan view.

The liquid crystal display device may further include a third insulating film formed on the plurality of pixel electrodes. The common electrode may overlap the pixel electrode via the third insulating film. The metal wiring may overlap the contact hole via the third insulating film. The metal wiring is formed one of directly above and directly below the common electrode.

The liquid crystal display device may further include a spacer for maintaining a distance between the first substrate and the second substrate. The spacer may be provided so as to overlap the metal wiring in plan view.

The liquid crystal display device may further include a plurality of touch detection electrodes extending in the column direction; and a plurality of drive electrodes extending in the row direction. Each of the plurality of touch detection electrodes and each of the plurality of drive electrodes form an electrostatic capacitance. The each of the plurality of touch detection electrodes may output a detection signal related to a drive signal which is applied to the each of the plurality of drive electrodes. The each of the plurality of drive electrodes may include the common electrode.

BRIEF DESCRIPTION OF THE DRAWINGS

FIG. 2A is a plan view illustrating a planar pattern of a second transparent substrate.

FIG. 2B is a plan view illustrating a planar pattern of the second transparent substrate with a first transparent substrate bonded thereto.

DETAILED DESCRIPTION

Embodiments of the present application are described below with reference to the drawings.

First Embodiment

Figure 1:
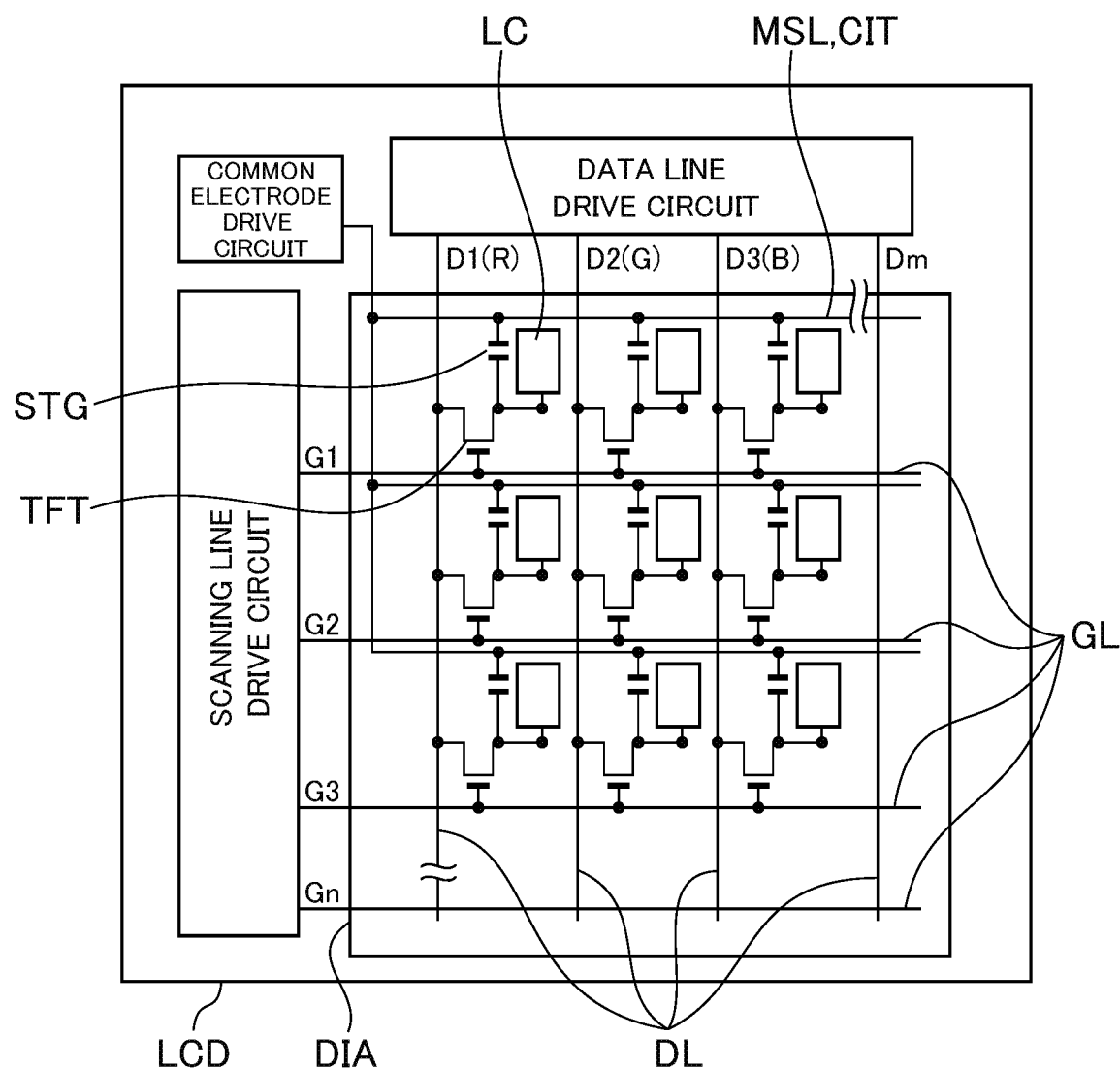
FIG. 1 illustrates an entire structure of a liquid crystal display device according to a first embodiment of the present application.

FIG. 1 illustrates an entire structure of a liquid crystal display device according to a first embodiment of the present application. A liquid crystal display device LCD includes an image display region DIA and a driving circuit region for driving the image display region DIA. In the image display region DIA, a plurality of pixel regions surrounded by adjacent gate signal lines GL and adjacent data signal lines DL are arranged in matrix in a row direction and a column direction. Note that, a direction in which the gate signal line GL extends is referred to as a row direction (horizontal direction in the figure) and a direction in which the data signal line DL extends is referred to as a column direction (vertical direction in the figure).

Active matrix display is carried out in each of the pixel regions. Specifically, a gate voltage is supplied from a scanning line drive circuit to gate signal lines (scanning lines) G1, G2, G3, . . . Gn in sequence, and a data voltage is supplied from a data line drive circuit to data signal lines D1, D2, D3, . . . , Dm. By on/off of a thin film transistor TFT by means of the gate voltage, the data voltage is supplied to a transparent pixel electrode PIT (pixel electrode) (see FIGS. 2A and 2B). By driving a liquid crystal layer LC by means of an electric field generated by the difference between the data voltage supplied to the transparent pixel electrode PIT and a common voltage supplied from a common electrode drive circuit to a transparent common electrode CIT (common electrode), transmittance of light is controlled to display an image. Note that, color display may be achieved by applying a desired data voltage to each of the data signal lines D1(R), D2(G), and D3(B) connected to pixel electrodes in respective pixel regions corresponding to red (R), green (G), and blue (B) colors, which are formed of vertical-stripe color filters.

A storage capacitor STG for preventing a voltage drop in the liquid crystal layer LC is formed in each of the pixel regions. The storage capacitor STG is formed in a region in which the transparent pixel electrode PIT and the transparent common electrode CIT overlap with each other via an insulating film (see FIG. 3). The common voltage is supplied from the common electrode drive circuit to the transparent common electrode CIT placed in the image display region DIA. A plurality of metal wirings MSL for reducing the resistance of the transparent common electrode CIT are electrically connected to the transparent common electrode CIT.

Figure 3:
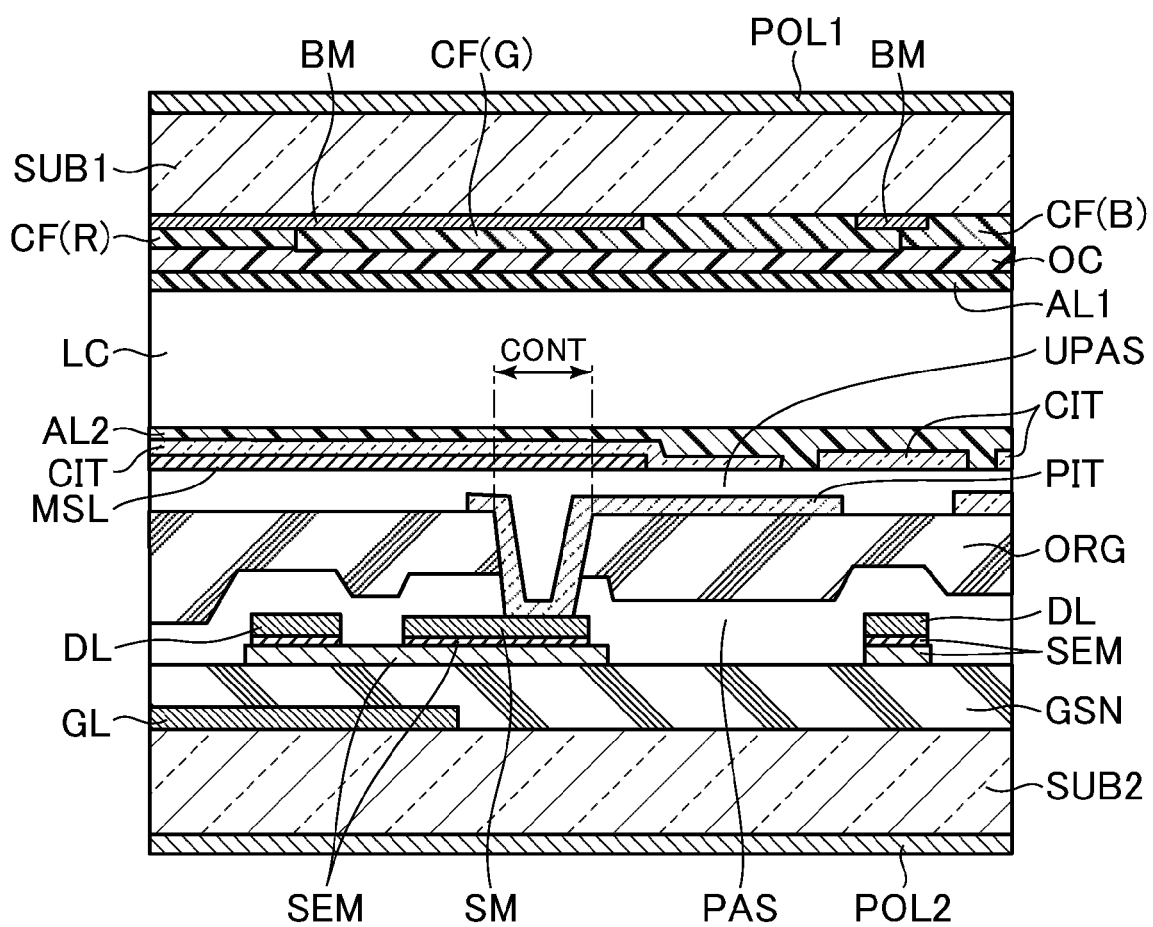
FIG. 3 is a sectional view of a pixel taken along the line 3-3' illustrated in each of FIGS. 2A and 2B.
Figure 4:
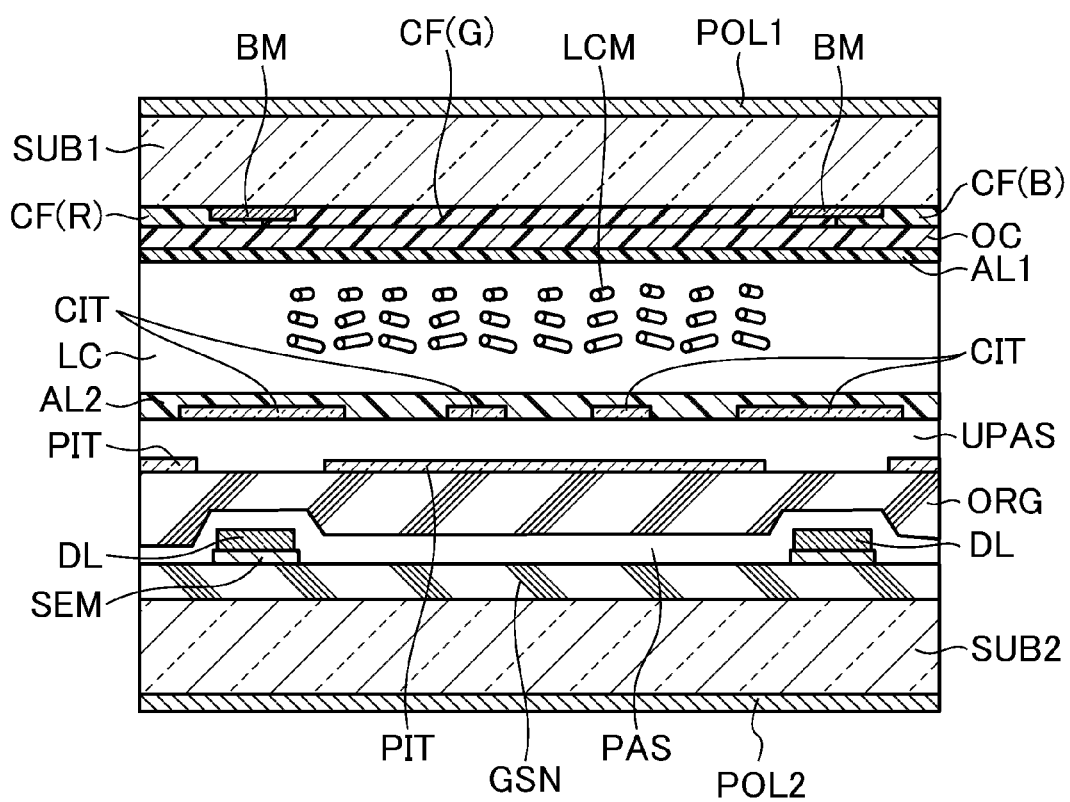
FIG. 4 is a sectional view of the pixel taken along the line 4-4' illustrated in each of FIGS. 2A and 2B.

FIGS. 2A and 2B are plan views illustrating a structure of a pixel. FIG. 2A illustrates a planar pattern of a second transparent substrate SUB2 (second substrate) on a rear surface side. FIG. 2B illustrates a planar pattern of the second transparent substrate SUB2 with a first transparent substrate SUB1 (first substrate) on a display surface side bonded thereto. FIG. 3 is a sectional view taken along the line 3-3' illustrated in each of FIGS. 2A and 2B. FIG. 4 is a sectional view taken along the line 4-4' illustrated in each of FIGS. 2A and 2B.

FIGS. 2A and 2B illustrate one pixel region surrounded by adjacent gate signal lines GL and adjacent data signal lines DL, and a part of pixel regions adjacent to and surrounding the pixel region.

A gate insulating film GSN is formed on a gate signal line GL which itself is formed on a glass substrate, and a semiconductor layer SEM is formed on the gate insulating film GSN. A data signal line DL and a source electrode SM (conductive electrode) of the thin film transistor TFT are formed on the semiconductor layer SEM. Further, a protective film PAS (protective insulating film, first insulating film) is formed so as to cover the data signal line DL and the source electrode SM. Further, an organic interlayer film ORG (organic protective film, second insulating film) is formed on the protective film PAS.

A contact hole CONT is formed in the protective film PAS and the organic interlayer film ORG over the source electrode SM for taking the data voltage out of the semiconductor layer SEM. The transparent pixel electrode PIT is formed on the organic interlayer film ORG and in the contact hole CONT. Further, an upper protective film UPAS (third insulating film) is formed so as to cover the transparent pixel electrode PIT. The metal wiring MSL is formed on the upper protective film UPAS so as to overlap the contact hole CONT in plan view (seen from the display surface side). The metal wiring MSL is provided for each of the gate signal lines GL, and extends in the row direction.

As illustrated in FIGS. 2A and 2B, a notch CP is formed in the gate signal line GL. The contact hole CONT is located within the notch CP in plan view. This permits the metal wiring MSL to be formed so as to overlap both the contact hole CONT and the gate signal line GL in plan view. Further, the metal wiring MSL is formed so as to overlap the semiconductor layer SEM of the thin film transistor TFT in plan view. As illustrated in FIG. 3, the transparent common electrode CIT is directly formed on the metal wiring MSL. This electrically connects the metal wiring MSL and the transparent common electrode CIT to each other.

As described above, the metal wiring MSL is formed above the gate signal line GL, the semiconductor layer SEM, and the contact hole CONT via the upper protective film UPAS. This enables the metal wiring MSL to have a smaller width than that of the gate signal line GL. Further, the width of a black matrix BM may be reduced as much as possible, and thus, the aperture ratio of the pixel may be improved to realize lower power consumption of the liquid crystal display device LCD.

Here, a method of driving the liquid crystal display device LCD is described in brief. The gate signal line GL is formed of a low resistance metal layer, and the gate voltage for scanning is applied thereto from the scanning line drive circuit illustrated in FIG. 1. The data signal line DL is also formed of a low resistance metal layer, and the data voltage for video is applied thereto from the data line drive circuit illustrated in FIG. 1. When a gate-on voltage is applied to the gate signal line GL, the semiconductor layer SEM of the thin film transistor TFT is reduced in resistance. With this, the data voltage applied to the data signal line DL is transferred via the source electrode SM formed of a low resistance metal layer to the transparent pixel electrode PIT electrically connected to the source electrode SM.

The common voltage is applied from the common electrode drive circuit illustrated in FIG. 1 to the transparent common electrode CIT. The transparent common electrode CIT overlaps the transparent pixel electrode PIT via the upper protective film UPAS. Slits (openings) are formed in the transparent common electrode CIT within one pixel region. An electric field for driving, which is generated from the transparent pixel electrode PIT via the slits in the transparent common electrode CIT and the liquid crystal layer LC to the transparent common electrode CIT, drives the liquid crystal layer LC to display an image.

Note that, in order to improve the aperture ratio, it is preferred to form the transparent common electrode CIT having a large width above the data signal line DL via the protective film PAS and the upper protective film UPAS so that electric field noise of the data signal line DL does not enter the liquid crystal layer LC. In this embodiment, the transparent common electrode CIT is formed so as to cover the data signal line DL in plan view. Specifically, the data signal line DL is covered with the transparent common electrode CIT via the protective film PAS and the upper protective film UPAS.

The shape of the slit in the transparent common electrode CIT is not specifically limited, and may be in an elongated shape, or may be a typical opening in a rectangular shape or in an oval shape. Further, the width of the slit may be larger or smaller than the distance between adjacent slits.

Figure 5:
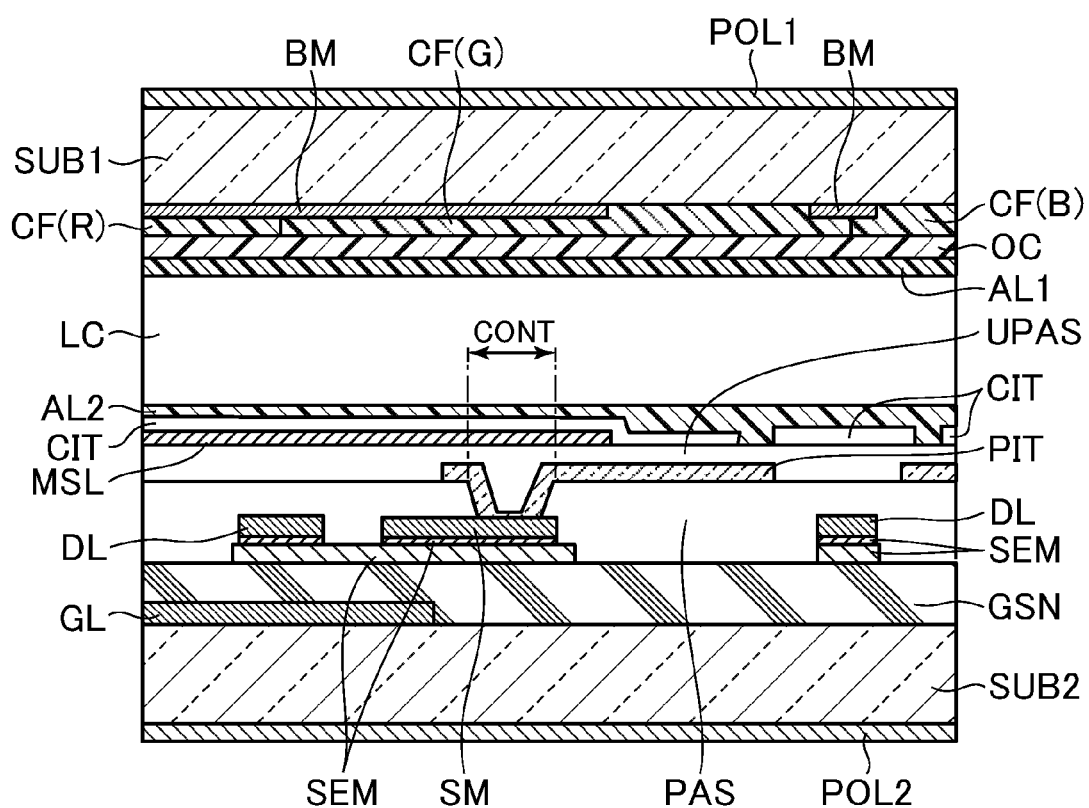
FIG. 5 is a sectional view of a pixel illustrating another structure of the liquid crystal display device illustrated in FIG. 1.

The liquid crystal display device LCD according to the present application is not limited to the embodiment described above. For example, as illustrated in FIG. 5, the organic interlayer film ORG (second insulating film) illustrated in FIG. 3 may be omitted. Specifically, in the liquid crystal display device LCD, the protective film PAS (first insulating film) may be formed so as to cover the data signal line DL and the source electrode SM, the contact hole CONT may be formed in the protective film PAS, and the transparent pixel electrode PIT may be formed on the protective film PAS and in the contact hole CONT. With regard to this structure, it is preferred that the metal wiring MSL be formed so as to make a detour around the semiconductor layer SEM so as not to overlap the semiconductor layer SEM, and so as to overlap the gate signal line GL and the contact hole CONT in plan view. In the structure illustrated in FIG. 5, also, the aperture ratio of a pixel may be improved by at least a region in which the metal wiring MSL and the contact hole CONT overlap each other.

Further, in the structures illustrated in FIGS. 2A and 2B, FIG. 3, and FIG. 5, the metal wiring MSL is formed so as to cover the entire region of the contact hole CONT in plan view, but the liquid crystal display device LCD according to the present application is not limited thereto. For example, the metal wiring MSL may be formed so as to overlap a part of the contact hole CONT in plan view. In this structure, also, the aperture ratio of a pixel may be improved by at least a region in which the metal wiring MSL and the contact hole CONT overlap each other. Specifically, the liquid crystal display device LCD according to the present application has a structure in which the metal wiring MSL is formed so as to overlap at least a part of the contact hole CONT in plan view.

Further, in the structures illustrated in FIGS. 2A and 2B, FIG. 3, and FIG. 5, the metal wiring MSL is formed on the upper protective film UPAS, and the transparent common electrode CIT is formed on the metal wiring MSL. However, the liquid crystal display device LCD according to the present application is not limited thereto. For example, the transparent common electrode CIT may be formed on the upper protective film UPAS, and the metal wiring MSL may be formed on the transparent common electrode CIT. Further, an insulating film may be formed between the metal wiring MSL and the transparent common electrode CIT, and the metal wiring MSL and the transparent common electrode CIT may be electrically connected to each other via a contact hole.

Here, a structure in section of a pixel which is common to the structures described above is described in brief with reference to FIG. 3 and FIG. 4. The liquid crystal layer LC is sandwiched between two transparent substrates, that is, the first transparent substrate SUB1 on the display surface side and the second transparent substrate SUB2 on the rear surface side. Positive liquid crystal molecules LCM (see FIG. 4) whose major axes are oriented along the direction of the electric field are encapsulated in the liquid crystal layer LC.

A first polarizing plate POL1 and a second polarizing plate POL2 are bonded to the outside of the first transparent substrate SUB1 and the second transparent substrate SUB2, respectively.

When the semiconductor layer SEM is directly irradiated with outside light, the resistance of the semiconductor layer SEM may decrease, and thus the storage characteristics of the liquid crystal display device LCD may be lowered, which may inhibit satisfactory image display. Therefore, the black matrix BM is formed on the first transparent substrate SUB1 at a position above the semiconductor layer SEM. The black matrix BM is also arranged at a position corresponding to a boundary between pixel regions. This prevents color mixture caused when light beams of adjacent pixel regions are viewed from an oblique direction. Thus, the black matrix BM provides such a great effect that an image can be displayed without blurring. Note that, when the width of the black matrix BM is too large, the aperture ratio and the transmittance are reduced. Therefore, in order to achieve bright and low power consumption performance in a high resolution liquid crystal display device, it is preferred to set the width of the black matrix BM to be as minimum as possible to the extent that color mixture is not caused when obliquely viewed. The black matrix BM is made of a resin material or a metal material using a black pigment.

The protective film PAS which covers the data signal line DL and the source electrode SM may be made of silicon nitride (SiN) or silicon dioxide ($SiO_2$). The organic interlayer film. ORG formed on the protective film PAS is made of a photosensitive organic material containing acrylic as a main component. The organic material has a relative dielectric constant of 4 or less, which is lower than the relative dielectric constant of silicon nitride of 6.7. Further, in terms of production, the organic material can be formed thicker than silicon nitride. The relative dielectric constant can be set low and the thickness can be set large, and hence a wiring capacitance formed between the transparent common electrode CIT and the data signal line DL or the gate signal line GL can be significantly reduced.

The transparent pixel electrode PIT is formed on the organic interlayer film ORG so as to contact on the source electrode SM via the contact hole CONT, and is electrically connected to the source electrode SM. The upper protective film UPAS which covers the transparent pixel electrode PIT is, similarly to other protective films, formed using silicon nitride or silicon dioxide as a material.

FIG. 4 illustrates three pixels having the data signal lines DL as boundaries. The center pixel corresponds to a green color filter CF(G) in the color filter CF arrangement. The left and right pixels correspond to a red color filter CF(R) and a blue color filter CF(B), respectively. The surface of the color filter CF is covered with an overcoat film OC which is an organic material. At the boundary between the pixels at which the data signal line DL is arranged, the black matrix BM is formed on the inner surface of the first transparent substrate SUB1 across the liquid crystal layer LC.

The liquid crystal layer LC is filled with the liquid crystal molecules LCM which are an organic material. A first alignment film AL1 formed on an inner surface of the first transparent substrate SUB1 and a second alignment film AL2 formed on an inner surface of the second transparent substrate SUB2 are subjected to orientation treatment to fix the major axes of the liquid crystal molecules LCM.

As described above, in a boundary region in which the black matrix BM and the data signal line DL are placed (region other than an aperture region), the transparent common electrode CIT having a width larger than that of the data signal line DL is formed so as to cover the data signal line DL via the protective film PAS and the upper protective film UPAS. This shields an electric field extending upward from the data signal line DL via the protective film PAS and the upper protective film UPAS. As a result, the unnecessary electric field noise extending upward from the data signal line DL is shielded by the transparent common electrode CIT which is wider than the data signal line DL and by the transparent pixel electrode PIT. The shielding effect may be enhanced by, as illustrated in FIG. 4, placing an end of the transparent common electrode CIT which covers the data signal line DL so as to overlap an end of the transparent pixel electrode PIT.

Next, a method of manufacturing the second transparent substrate SUB2 (TFT substrate) is described. FIGS. 6A to 12B illustrate a manufacturing process of the thin film transistor TFT, the wiring region, and the pixel aperture region, which are formed on the second transparent substrate SUB2. The respective figures illustrate the manufacturing process in plan view of a single pixel and in sectional view taken along the line b-b' of the plan view. The respective figures illustrate each photoetching processing step in the above-mentioned TFT manufacturing process.

Figure 6A:
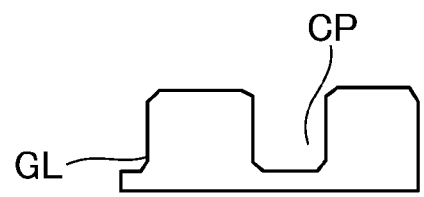
FIG. 6A is a plan view illustrating a first photoetching step in a manufacturing process of a TFT substrate.
Figure 6A:
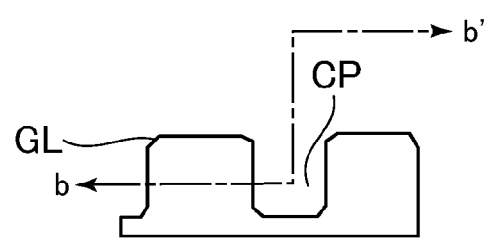
Figure 6B:
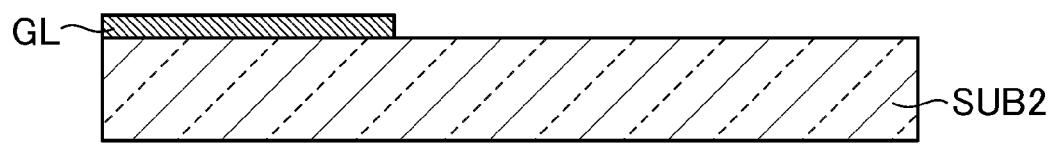
FIG. 6B is a sectional view of the TFT substrate taken along the line b-b' of FIG. 6A.

FIG. 6A is a plan view of the pixel after a first photoetching step is completed, and FIG. 6B is a sectional view taken along the line b-b' of FIG. 6A. A metal material to be the gate signal line GL is formed on a glass substrate by sputtering, and is patterned in the first photoetching step. The patterning is carried out using halftone exposure. This forms as a planar pattern the gate signal line GL having the notch CP formed therein. The metal material is, for example, a laminate film formed of copper Cu at a thickness of 100 nm to 300 nm and molybdenum Mo formed thereon. As the metal wiring material, a laminate film of molybdenum Mo and aluminum Al, a laminate film of titanium Ti and aluminum Al, or a MoW alloy of molybdenum Mo and tungsten W may be used.

Figure 7A:
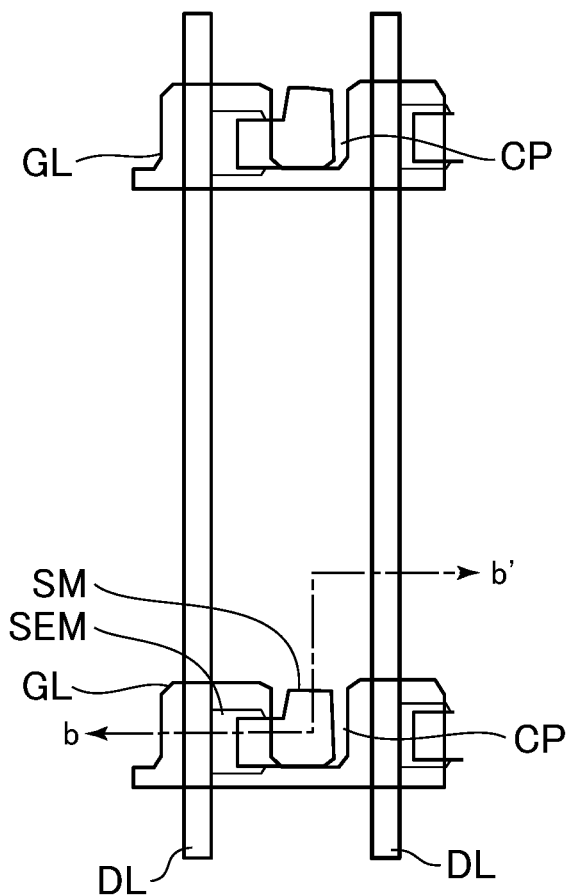
FIG. 7A is a plan view illustrating a second photoetching step in the manufacturing process of the TFT substrate.
Figure 7B:
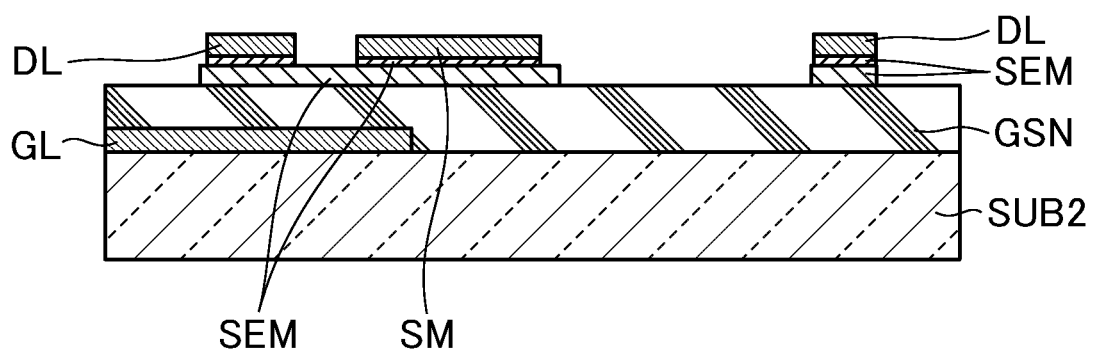
FIG. 7B is a sectional view of the TFT substrate taken along the line b-b' of FIG. 7A.

FIG. 7A is a plan view of the pixel after a second photoetching step is completed, and FIG. 7B is a sectional view taken along the line b-b' of FIG. 7A. The gate insulating film GSN of silicon nitride is laminated so as to cover the gate signal line GL by chemical vapor deposition (CVD), and the semiconductor layer SEM of amorphous silicon or indium gallium zinc oxide IGZO is laminated on the gate insulating film GSN. Further on the semiconductor layer SEM, a laminate film of molybdenum Mo and copper Cu is formed by sputtering. As the material of the metal wiring, similarly to the material of the gate signal line GL, a laminate film of molybdenum Mo and aluminum Al, a laminate film of titanium Ti and aluminum Al, or a MoW alloy of molybdenum Mo and tungsten W may be used. The semiconductor layer SEM and the data signal line DL are processed after the continuous film formation, and thus, the data signal line DL and the semiconductor layer SEM are processed to have substantially the same width. The data signal line DL and the source electrode SM which is connected to the transparent pixel electrode PIT are simultaneously formed. The semiconductor layer SEM is formed of two layers a low resistance semiconductor layer on a surface thereof containing phosphorus and a semiconductor layer containing a less amount of impurities. The low resistance semiconductor layer SEM is removed in a thin film transistor TFT region between the data signal line DL and the source electrode SM. When an on-voltage is applied to a gate electrode, electrons are induced at an interface of a gate insulating film GSN, the resistance is lowered, and on-operation is carried out.

Figure 8A:
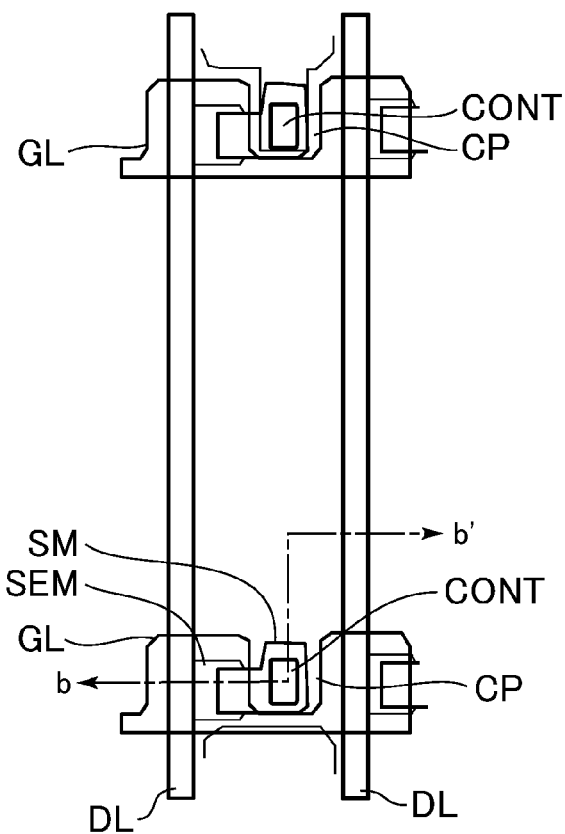
FIG. 8A is a plan view illustrating a third photoetching step in the manufacturing process of the TFT substrate.
Figure 8B:
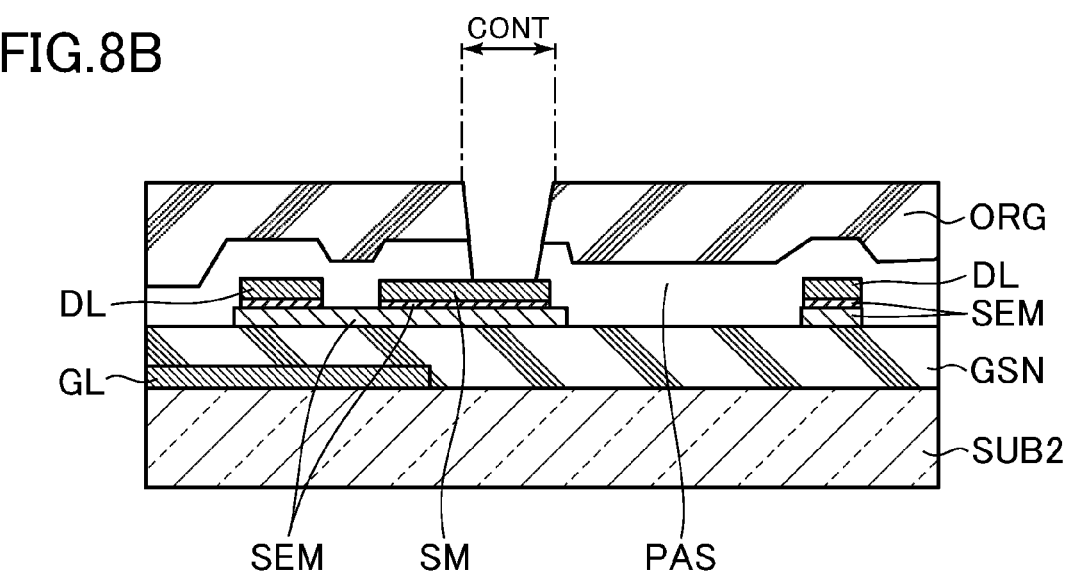
FIG. 8B is a sectional view of the TFT substrate taken along the line b-b' of FIG. 8A.

FIG. 8A is a plan view of the pixel after a third photoetching step is completed, and FIG. 8B is a sectional view taken along the line b-b' of FIG. 8A. The protective film PAS and the organic interlayer film ORG are formed in sequence so as to cover the semiconductor layer SEM, the data signal line DL, and the source electrode SM, and the contact hole CONT is formed over the source electrode SM. As the organic interlayer film ORG, photosensitive acrylic having a thickness of 2 μm to 4 μm is used. The protective film PAS is silicon nitride formed by CVD.

Figure 9A:
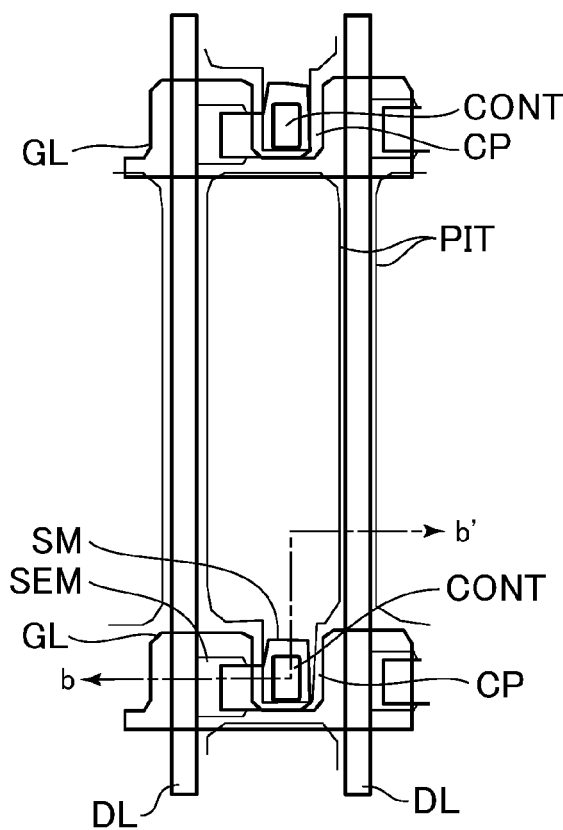
FIG. 9A is a plan view illustrating a fourth photoetching step in the manufacturing process of the TFT substrate.
Figure 9B:
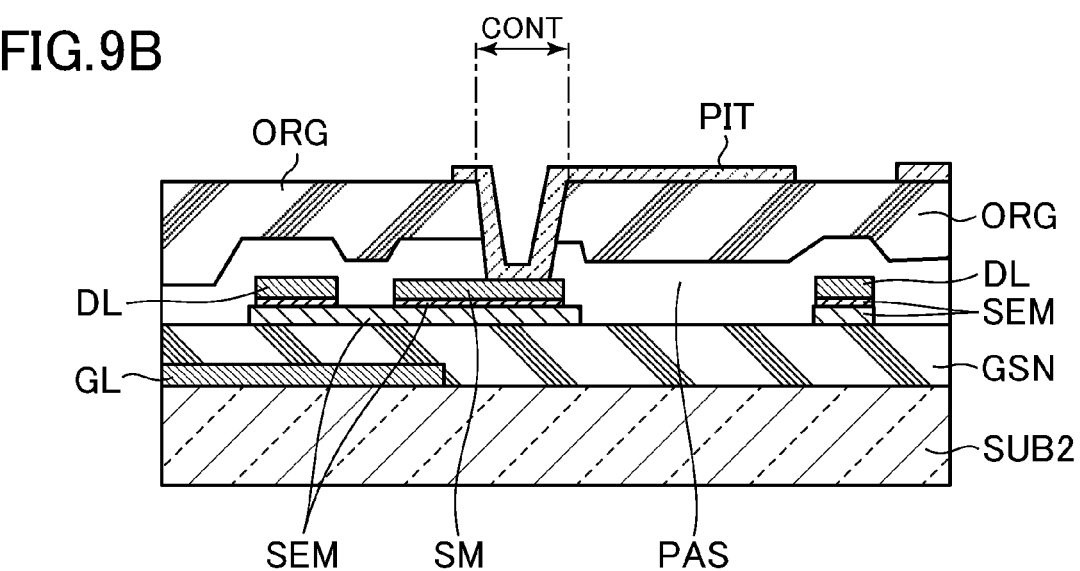
FIG. 9B is a sectional view of the TFT substrate taken along the line b-b' of FIG. 9A.

FIG. 9A is a plan view of the pixel after a fourth photoetching step is completed, and FIG. 9B is a sectional view taken along the line b-b' of FIG. 9A. A film of indium tin oxide ITO which is a transparent electrode material is formed by sputtering on the source electrode SM, and, through the photoetching step, the transparent pixel electrode PIT is formed. The transparent pixel electrode PIT is directly formed on the source electrode SM. This electrically connects the transparent pixel electrode PIT and the source electrode SM to each other via the contact hole CONT.

Figure 10A:
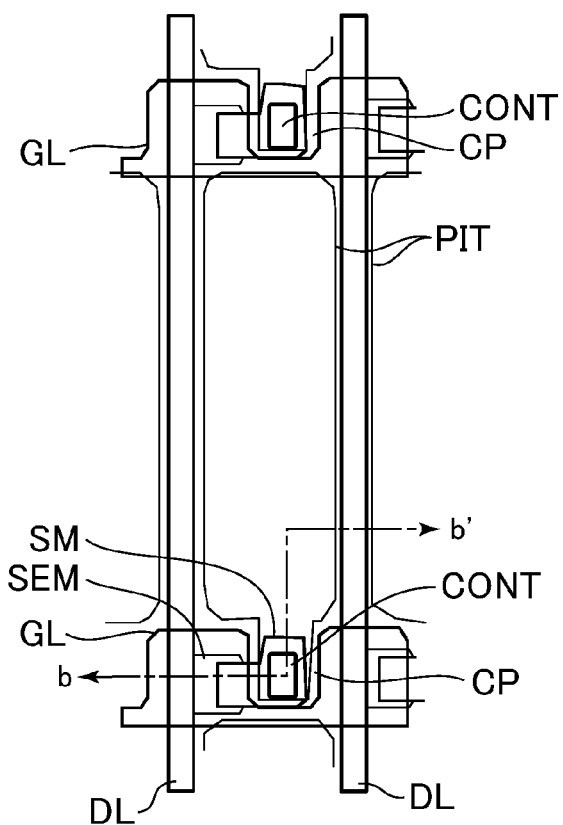
FIG. 10A is a plan view illustrating a fifth photoetching step in the manufacturing process of the TFT substrate.
Figure 10B:
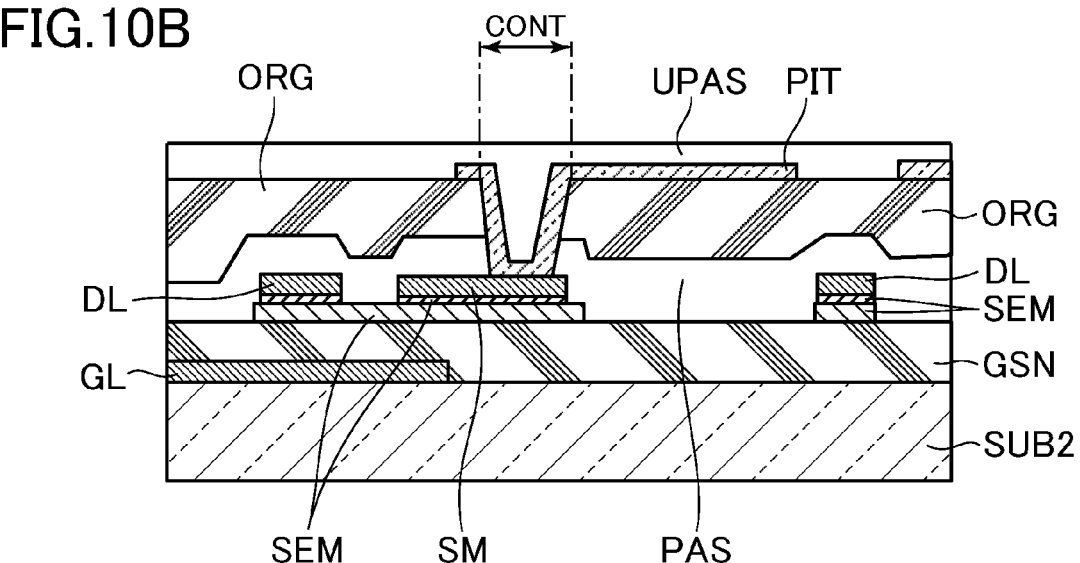
FIG. 10B is a sectional view of the TFT substrate taken along the line b-b' of FIG. 10A.

FIG. 10A is a plan view of the pixel after a fifth photoetching step is completed, and FIG. 10B is a sectional view taken along the line b-b' of FIG. 10A. The upper protective film UPAS is formed so as to cover the transparent pixel electrode PIT. As the upper protective film UPAS, silicon nitride is formed. Note that, although not illustrated, an opening for contact is formed outside the image display region DIA (see FIG. 1) in this step.

Figure 11A:
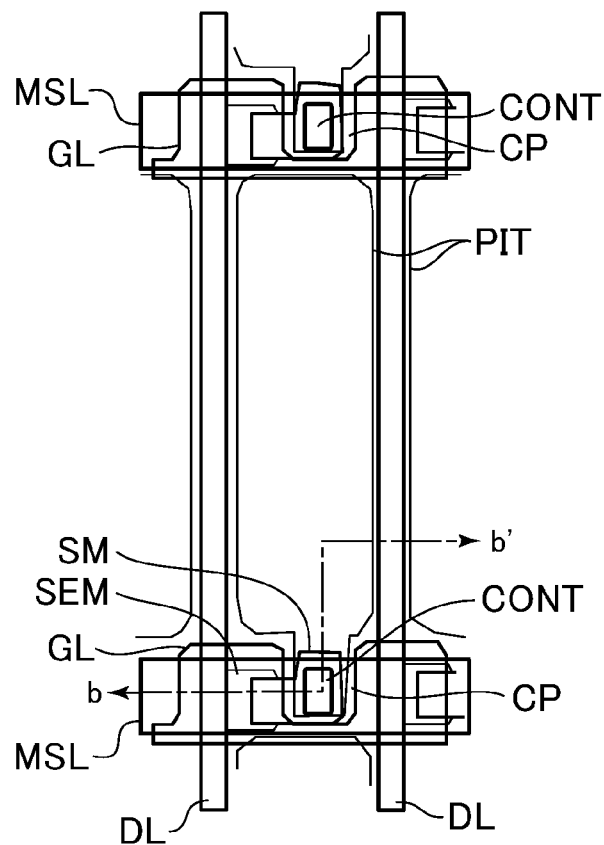
FIG. 11A is a plan view illustrating a sixth photoetching step in the manufacturing process of the TFT substrate.
Figure 11B:
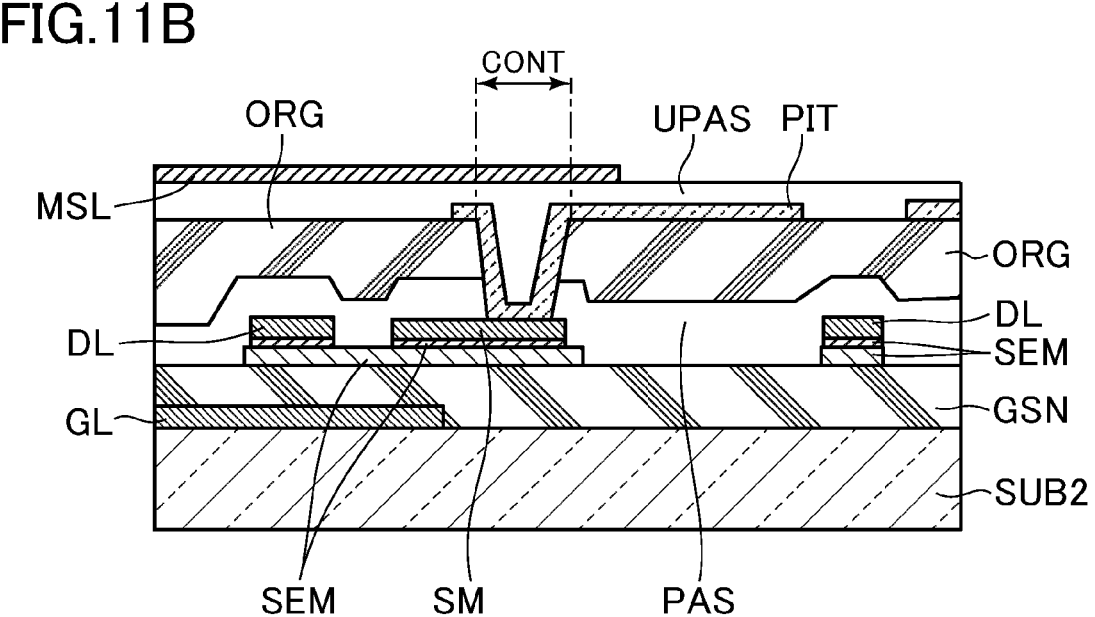
FIG. 11B is a sectional view of the TFT substrate taken along the line b-b' of FIG. 11A.

FIG. 11A is a plan view of the pixel after a sixth photoetching step is completed, and FIG. 11B is a sectional view taken along the line b-b' of FIG. 11A. The metal wiring MSL is formed on the upper protective film UPAS. As a metal material of the metal wiring MSL, a laminate film of copper Cu and molybdenum Mo, a single layer film of molybdenum Mo, or a metal thin film in which a high-melting metal such as molybdenum Mo or titanium Ti is laminated on a surface of aluminum Al is used. The metal wiring MSL is formed so as to overlap the contact hole CONT via the upper protective film UPAS in plan view.

Figure 12A:
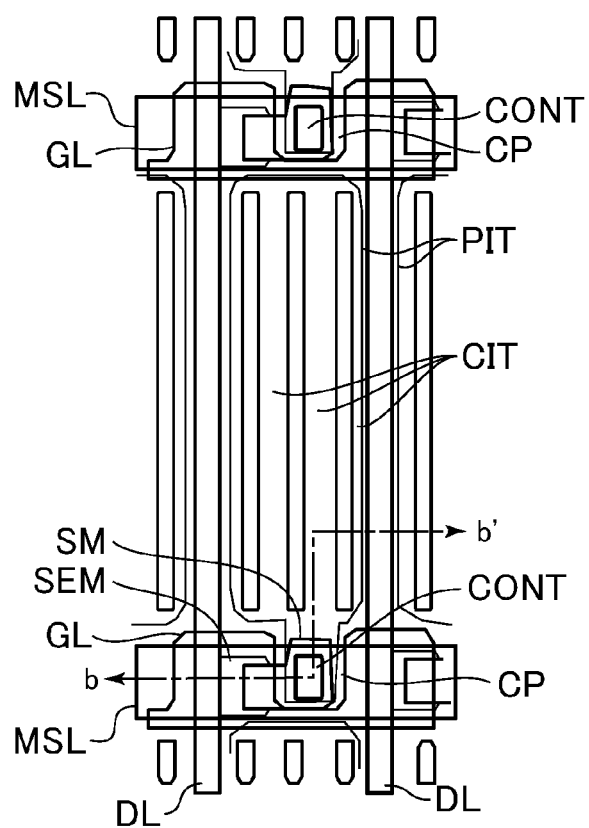
FIG. 12A is a plan view illustrating a seventh photoetching step in the manufacturing process of the TFT substrate.
Figure 12B:
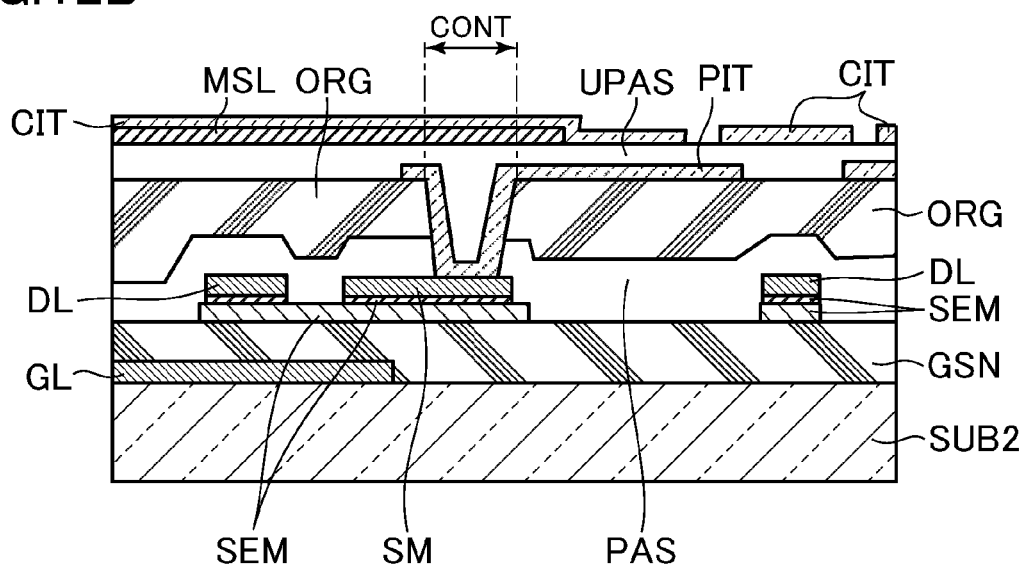
FIG. 12B is a sectional view of the TFT substrate taken along the line b-b' of FIG. 12A.

FIG. 12A is a plan view of the pixel after a seventh photoetching step is completed, and FIG. 12B is a sectional view taken along the line b-b' of FIG. 12A. The transparent common electrode CIT formed of indium tin oxide ITO is formed so as to cover the metal wiring MSL. This electrically connects the metal wiring MSL and the transparent common electrode CIT to each other.

As described above, the seven photoetching steps may manufacture the second transparent substrate SUB2 (TFT substrate) of the liquid crystal display device LCD according to this embodiment.

Second Embodiment

A second embodiment of the present application is described in the following with reference to the attached drawings. Note that, for the sake of convenience of description, like reference symbols are used to designate members having the same functions as those described in the first embodiment, and description thereof is omitted. Further, unless otherwise specified, the terms defined in the first embodiment are used in accordance with the definitions also in this embodiment.

The liquid crystal display device LCD according to the second embodiment is any one of the liquid crystal display devices LCD according to the first embodiment further including a spacer SOC for maintaining the distance between the first transparent substrate SUB1 and the second transparent substrate SUB2 (liquid crystal gap spacer).

Figure 13:
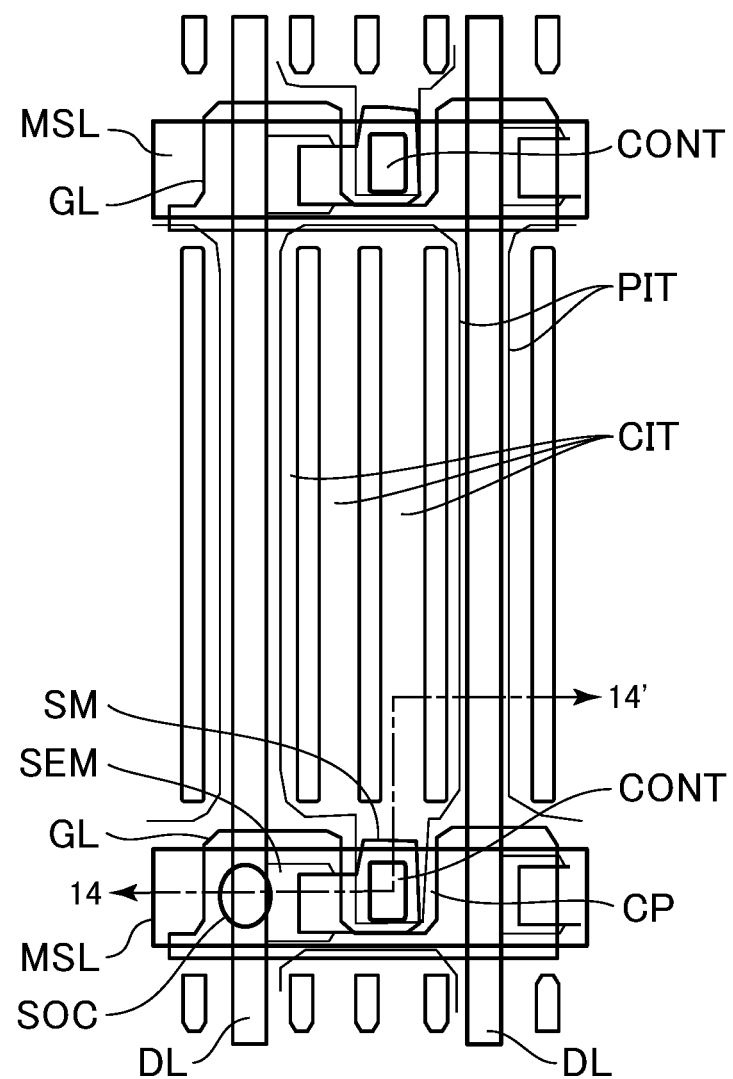
FIG. 13 is a plan view of a pixel in a liquid crystal display device according to a second embodiment of the present application.
Figure 14:
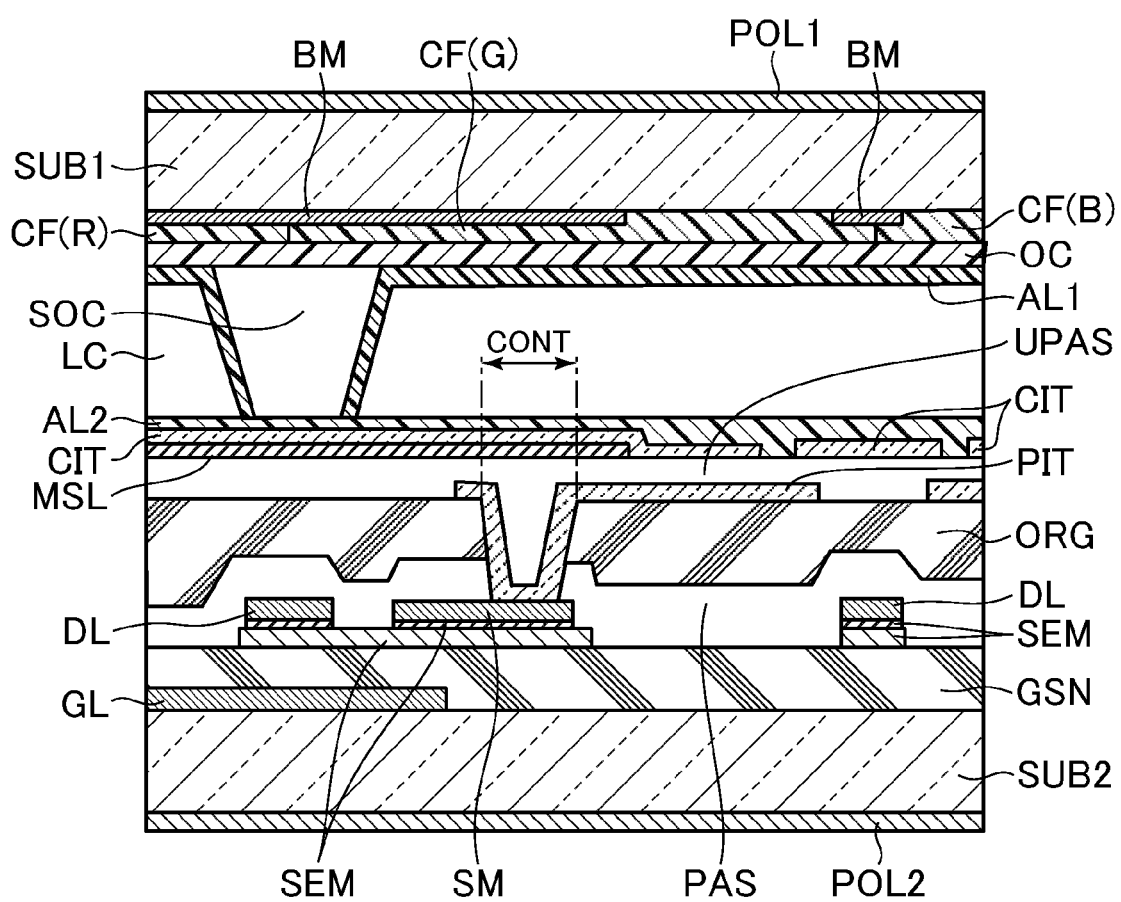
FIG. 14 is a sectional view of the pixel taken along the line 14-14' of FIG. 13.

FIG. 13 is a plan view illustrating a structure of a pixel according to the second embodiment, and FIG. 14 is a sectional view taken along the line 14-14' of FIG. 13.

The spacer SOC is placed so as to overlap the metal wiring MSL at an intersection of the gate signal line GL and the data signal line DL in plan view. The spacer SOC itself is formed on the first transparent substrate SUB1.

As described above, the metal wiring MSL is formed in the extending direction of the gate signal line GL so as to cover the source electrode SM overlapping the notch CP in which the gate signal line GL does not exist and to cover the contact hole CONT in plan view. The gate signal line GL does not exist under the source electrode SM in the contact hole CONT portion, and thus, backlight from the outside of the second transparent substrate SUB2 is transmitted through the vicinity of the source electrode SM in an oblique direction to cause light leakage. This may be prevented by increasing the width of the black matrix BM of the first transparent substrate SUB1, but the aperture ratio is reduced.

In this regard, the metal wiring MSL blocks light to the source electrode SM and the contact hole CONT, and thus, the aperture ratio may be prevented from being reduced without the necessity of increasing the width of the black matrix BM.

Light leakage tends to occur when the orientation is insufficient. With regard to negative liquid crystal, in orientation processing involving rubbing, a shadow due to a height difference caused by the spacer SOC on the first transparent substrate SUB1 extends in the extending direction of the gate signal line GL. Therefore, light leakage due to the insufficiency of orientation becomes conspicuous without the metal wiring MSL. However, the metal wiring MSL also blocks light onto the contact hole CONT, and, as a result, it is not necessary to increase the width of the black matrix BM over the gate signal line GL. Thus, the aperture ratio may be prevented from being reduced.

With regard to positive liquid crystal, a shadow due to orientation is caused in the extending direction of the data signal line DL. In this regard, as illustrated in FIG. 2B, the black matrix BM having a width larger than that of the data signal line DL extends. Therefore, by forming, as in the second embodiment, the spacer SOC over the metal wiring MSL at the intersection of the gate signal line GL and the data signal line DL, light leakage can be inhibited.

The spacer SOC is formed of photosensitive acrylic and has a thickness of 3 μm to 4.5 μm. The spacer SOC is formed on an overcoat film OC of the first transparent substrate SUB1. The first alignment film AL1 is formed on a side surface of the spacer SOC. The first transparent substrate SUB1 and the second transparent substrate SUB2 are positioned so that the spacer SOC is in contact with the transparent common electrode CIT formed on the metal wiring MSL.

Third Embodiment

A third embodiment of the present application is described in the following with reference to the attached drawings. Note that, for the sake of convenience of description, like reference symbols are used to designate members having the same functions as those described in the first and second embodiments, and description thereof is omitted. Further, unless otherwise specified, the terms defined in the first and second embodiments are used in accordance with the definitions also in this embodiment.

The liquid crystal display device LCD according to the third embodiment is any one of the liquid crystal display devices LCD according to the first and second embodiments further having a function of a touch panel.

Figure 15:
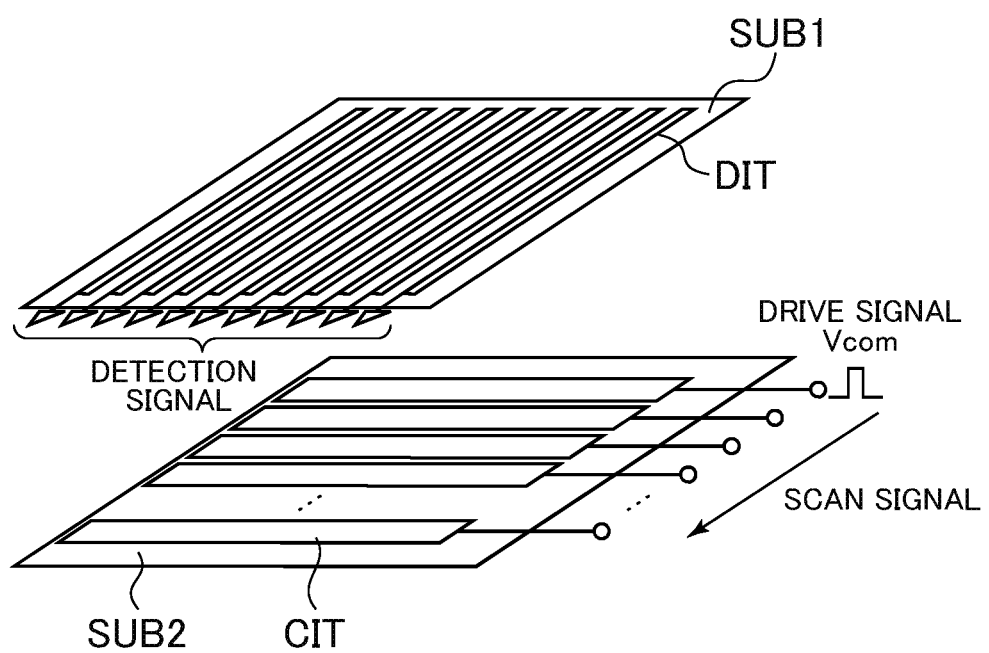
FIG. 15 is a schematic view for illustrating a function of a touch panel in a liquid crystal display device according to a third embodiment of the present application.

FIG. 15 is a schematic view for illustrating the function of a touch panel. The liquid crystal display device LCD according to the third embodiment is any one of the liquid crystal display devices LCD according to the first and second embodiments further including a block-for-driving transparent detection electrode DIT (touch detection electrode) on the display surface side of the first transparent substrate SUB1, and a block-for-driving transparent drive electrode CIT (drive electrode) on the second transparent substrate SUB2. The liquid crystal display device LCD according to the third embodiment has a function as a so-called capacitance touch panel (in-cell touch panel). The block-for-driving transparent electrodes (touch detection electrode and drive electrode) may have an electrode width for several tens of pixels coupled to one another, or may be structured so that electrodes for several tens of pixels, each having a resolution corresponding to one pixel, are coupled to one another outside the image display region DIA. In this liquid crystal display device LCD, the transparent common electrode CIT on the second transparent substrate SUB2 functions as the block-for-driving transparent drive electrode.

Figure 16:
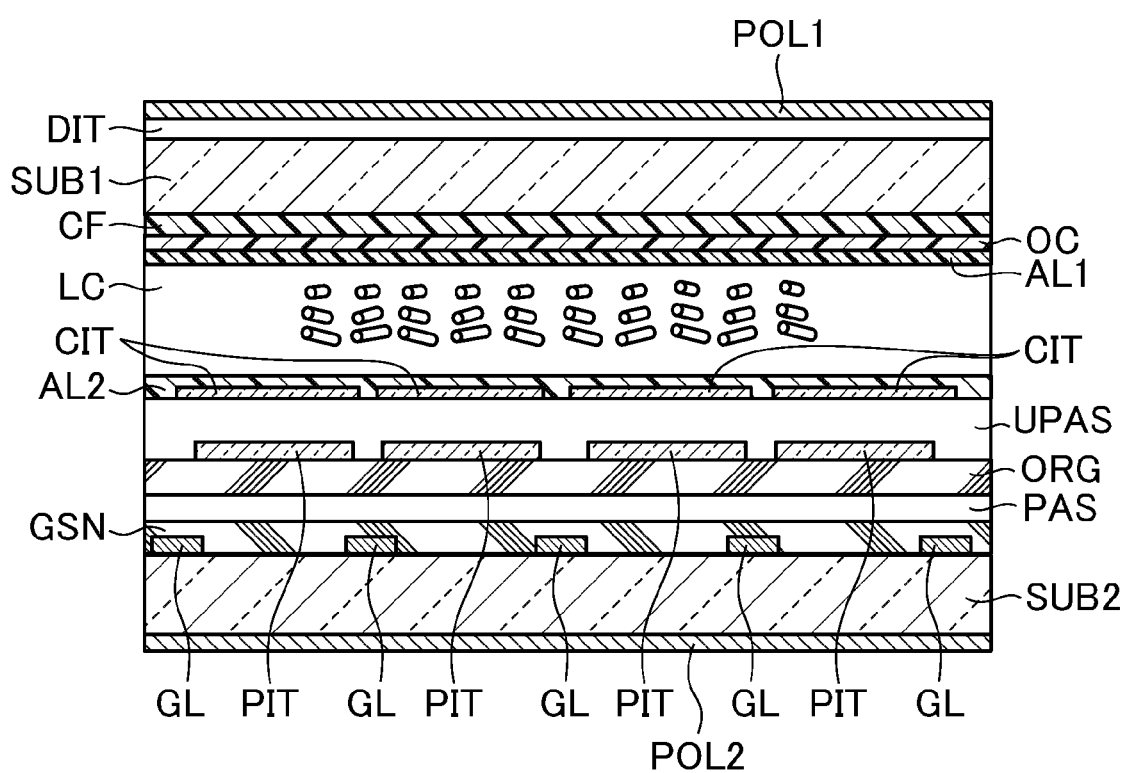
FIG. 16 is a sectional view of the liquid crystal display device according to the third embodiment.

FIG. 16 is a schematic sectional view of the liquid crystal display device LCD having the touch panel function. The block-for-driving transparent detection electrode DIT is formed on the display surface side of the first transparent substrate SUB1. The transparent common electrode CIT for displaying an image doubles as the block-for-driving transparent drive electrode CIT. The block-for-driving transparent detection electrode DIT and the block-for-driving transparent drive electrode CIT are separated into the shape of a block, or separated for one pixel and a plurality thereof are coupled into the shape of a block outside the image display region DIA. The block-for-driving transparent detection electrode DIT and the block-for-driving transparent drive electrode CIT are arranged so as to be orthogonal to each other in plan view.

The block-for-driving transparent drive electrode CIT also serves as a common electrode for driving the liquid crystal. Thus, the block-for-driving transparent drive electrode CIT is separated in the row direction for several tens of pixels into the shape of a strip, or separated for one pixel and a plurality thereof are coupled to one another outside the image display region DIA. It is preferred that a region in which the block-for-driving transparent drive electrodes CIT are separated from one another into the shape of a strip be, in order to minimize the influence on display, substantially at the center of the black matrix BM which overlaps the gate signal line GL.

FIG. 15 and FIG. 16 illustrate an example in which the block-for-driving transparent drive electrode CIT is separated from others each for one pixel row, but the planar pattern is similar with regard to a structure in which the block-for-driving transparent drive electrode CIT is separated from others each for one block. The block-for-driving transparent drive electrode CIT is separated from another in the vertical direction substantially at the center of the black matrix BM which covers the gate signal line GL extending in the row direction.

Figure 17:
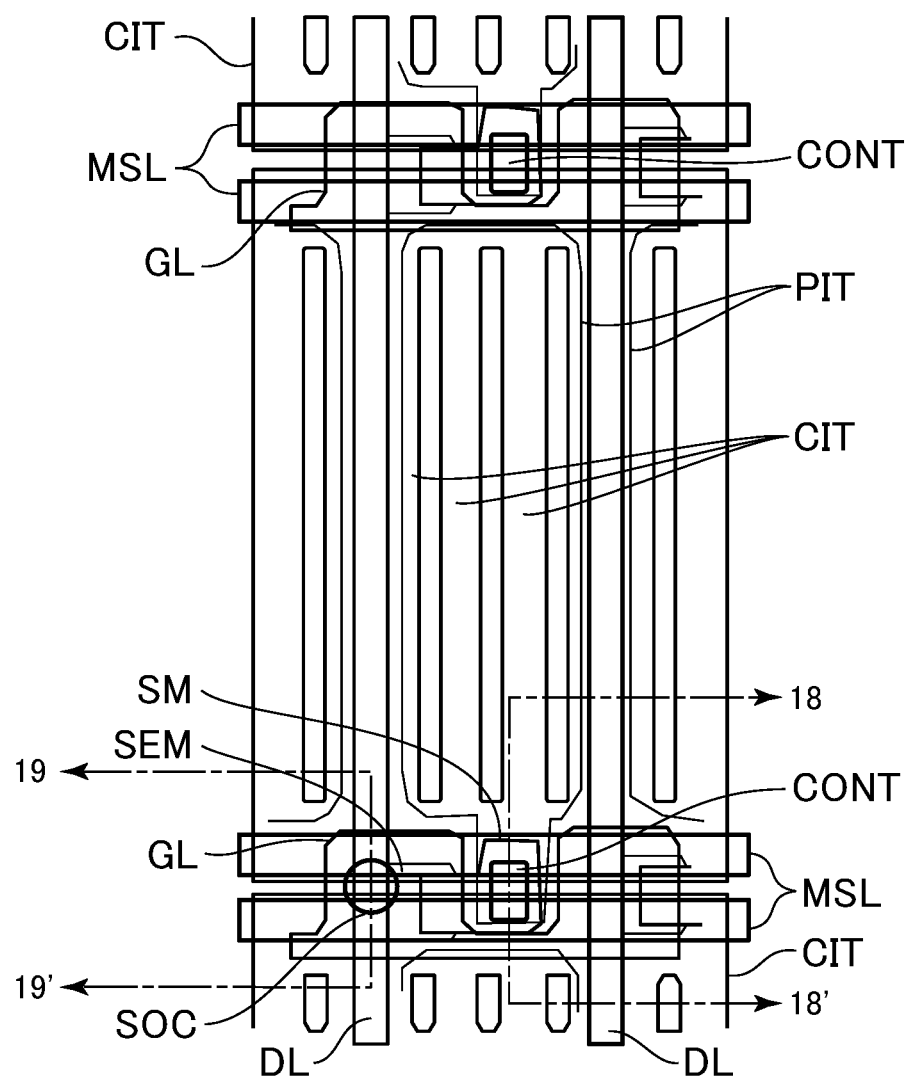
FIG. 17 is a plan view of a pixel in the liquid crystal display device according to the third embodiment.

As illustrated in FIG. 17, the metal wiring MSL is formed on both end sides of the block-for-driving transparent drive electrode CIT in plan view so as to be within the range of the black matrix BM which covers the gate signal line GL. By placing the metal wiring MSL on the both end sides of the block-for-driving transparent drive electrode CIT, light leakage from a peripheral region of the contact hole CONT may be inhibited. However, the metal wiring MSL is not necessarily required to be placed on the both end sides of the block-for-driving transparent drive electrode CIT. In this way, the metal wiring MSL is formed so as to cover at least a part of the contact hole CONT and to extend in the row direction.

Similarly to the case of the second embodiment, the spacer SOC is placed so as to overlap the metal wiring MSL in plan view and to extend from the first transparent substrate SUB1 into contact with an upper portion of the intersection of the gate signal line GL and the data signal line DL.

Figure 18:
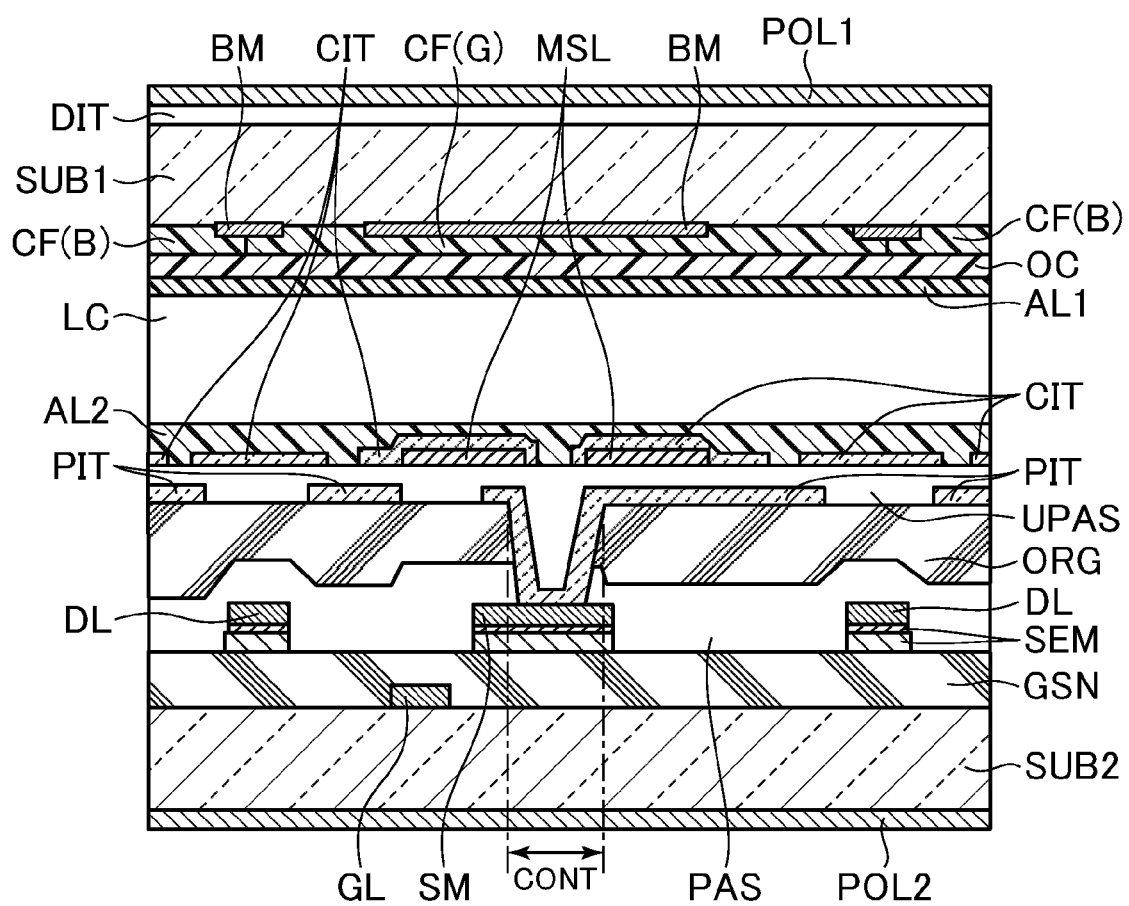
FIG. 18 is a sectional view of the pixel taken along the line 18-18' of FIG. 17.

FIG. 18 is a sectional view taken along the line 18-18' of FIG. 17. As illustrated in the figure, the two metal wirings MSL separated from each other are formed so as to overlap the contact hole CONT. The block-for-driving transparent drive electrode CIT is formed so as to be in contact with the metal wiring MSL, and is separated from another in a region over the contact hole CONT.

Figure 19:
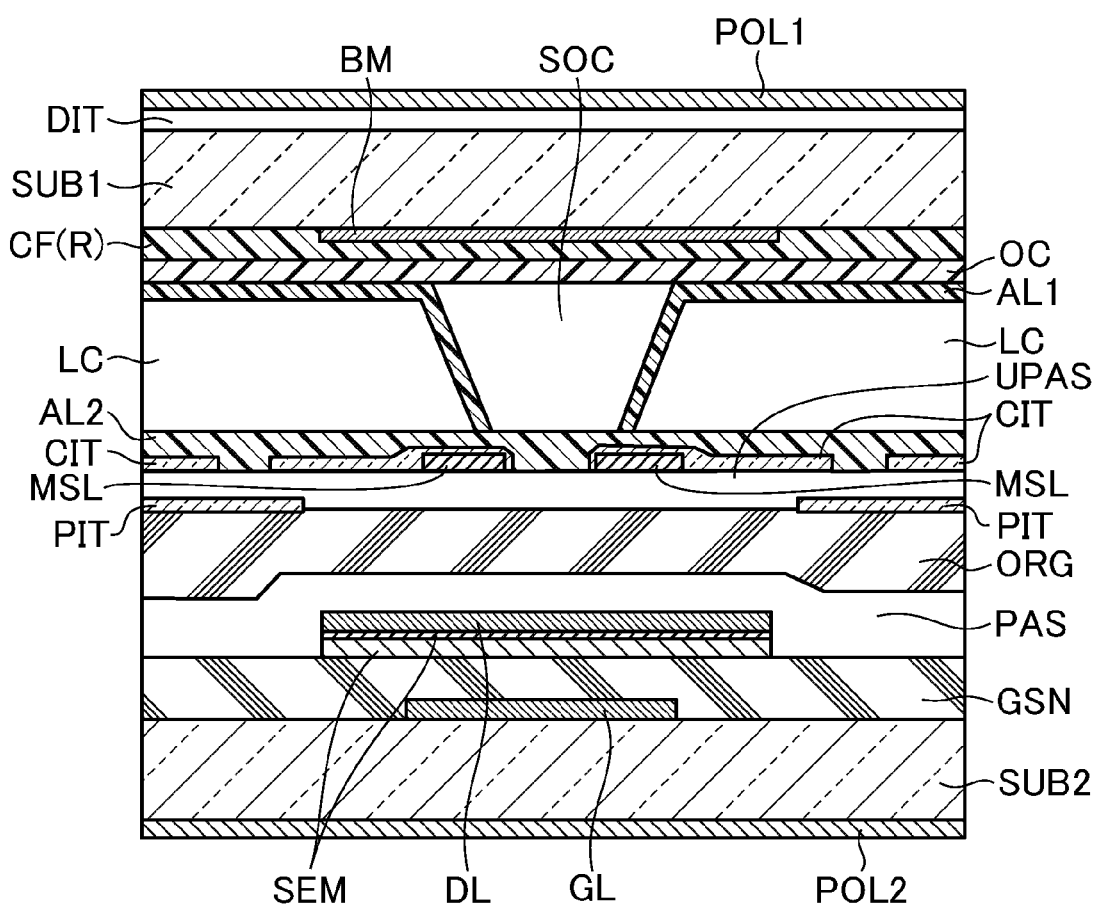
FIG. 19 is a sectional view of the pixel taken along the line 19-19' of FIG. 17.

FIG. 19 is a sectional view taken along the line 19-19' of FIG. 17. As illustrated in the figure, the spacer SOC formed on the first transparent substrate SUB1 is placed so as to be in contact with the second transparent substrate SUB2 over the intersection of the gate signal line GL and the data signal line DL. The spacer SOC is placed at a position which is above the metal wiring MSL and which is in contact with the block-for-driving transparent drive electrode CIT.

As a method of detecting touch, a well-known method may be used. For example, a touch location (coordinates) is detected as follows. A pair of electrodes (block-for-driving transparent drive electrode CIT and block-for-driving transparent detection electrode DIT) placed so as to be opposed to each other with a dielectric sandwiched therebetween form a capacitive element (electrostatic capacitor). An end of the capacitive element is connected to a drive signal source (not shown) and the other end of the capacitive element is connected to a voltage detector (not shown). A drive signal Vcom of a predetermined frequency (for example, about several kilohertz to more than ten kilohertz) is supplied in sequence to the block-for-driving transparent drive electrode CIT (an end of the capacitive element) from the drive signal source, and a detection signal in accordance with the capacitance value of the capacitive element is output from the block-for-driving transparent detection electrode DIT (the other end of the capacitive element). Whether there is a touch or not is determined based on the detection signals output from the respective block-for-driving transparent detection electrodes DIT, and, based on the result of the determination, the touch coordinates are detected.

By the structures of the liquid crystal display devices according to the embodiments described above, the aperture ratio of a pixel may be improved at least by a region in which the metal wiring and the contact hole overlap. Therefore, in an IPS liquid crystal display device, the aperture ratio of a pixel may be improved.

While there have been described what are at present considered to be certain embodiments of the application, it will be understood that various modifications may be made thereto, and it is intended that the appended claims cover all such modifications as fall within the true spirit and scope of the invention.

What is claimed is:
1. A liquid crystal display device, comprising:
   a first substrate on a display surface side and a second substrate on a rear surface side, the first substrate and the second substrate being placed so as to be opposed to each other with liquid crystal interposed therebetween,
   the second substrate comprising:
   a plurality of gate signal lines formed thereon;
   a plurality of data signal lines formed thereon;
   a plurality of pixel electrodes and a plurality of thin film transistors formed thereon, which are provided correspondingly to a plurality of pixels formed in a row direction in which the plurality of gate signal lines extend and in a column direction in which the plurality of data signal lines extend;
   a common electrode formed thereon, which is provided on the display surface side so as to be opposed to the plurality of pixel electrodes;
   a plurality of metal wirings formed thereon, which are electrically connected to the common electrode; and
   a first insulating film formed between the plurality of pixel electrodes and the plurality of thin film transistors, wherein each of the plurality of pixel electrodes is connected to a conductive electrode of each of the plurality of thin film transistors via a contact hole formed in the first insulating film, wherein the common electrode is formed so as to overlap the data signal line in plan view, and wherein two metal wirings of the plurality of metal wirings are disposed adjacent to each other, and each of the two metal wirings at least partially overlaps the contact hole in plan view.

2. The liquid crystal display device according to claim 1, further comprising a second insulating film formed on the first insulating film between the plurality of pixel electrodes and the plurality of thin film transistors, wherein the contact hole is formed in the first insulating film and in the second insulating film, and wherein each of the plurality of metal wirings is formed so as to overlap, in plan view, the contact hole and a semiconductor layer which forms the thin film transistor.

3. The liquid crystal display device according to claim 2, wherein the second insulating film comprises an organic material.

4. The liquid crystal display device according to claim 1, wherein the two metal wirings at least partially overlap the gate signal line in plan view.

5. The liquid crystal display device according to claim 4, wherein the gate signal line has a notch, and wherein the contact hole is located within the notch in plan view.

6. The liquid crystal display device according to claim 1, further comprising a third insulating film formed on the plurality of pixel electrodes, wherein the common electrode overlaps the pixel electrode via the third insulating film, wherein the two metal wirings overlap the contact hole via the third insulating film, and wherein the two metal wirings are formed directly above or directly below the common electrode.

7. The liquid crystal display device according to claim 1, further comprising a spacer for maintaining a distance between the first substrate and the second substrate, wherein the spacer is provided so as to overlap at least partially one or both of the two metal wirings in plan view.

8. The liquid crystal display device according to claim 1, further comprising:

a plurality of touch detection electrodes extending in the column direction; and a plurality of drive electrodes extending in the row direction, wherein each of the plurality of touch detection electrodes and each of the plurality of drive electrodes form an electrostatic capacitance, wherein the each of the plurality of touch detection electrodes outputs a detection signal related to a drive signal which is applied to the each of the plurality of drive electrodes, and wherein the each of the plurality of drive electrodes comprises the common electrode.

9. The liquid crystal display device according to claim 1, wherein a maximum width of each of the two metal wirings is smaller than a maximum width of the gate signal line.

10. The liquid crystal display device according to claim 1, wherein the two metal wirings are electrically separated from each other.

11. The liquid crystal display device according to claim 1, wherein each of the two metal wirings has only one end that overlaps the contact hole in plan view.

* * * * *